Figure 1:
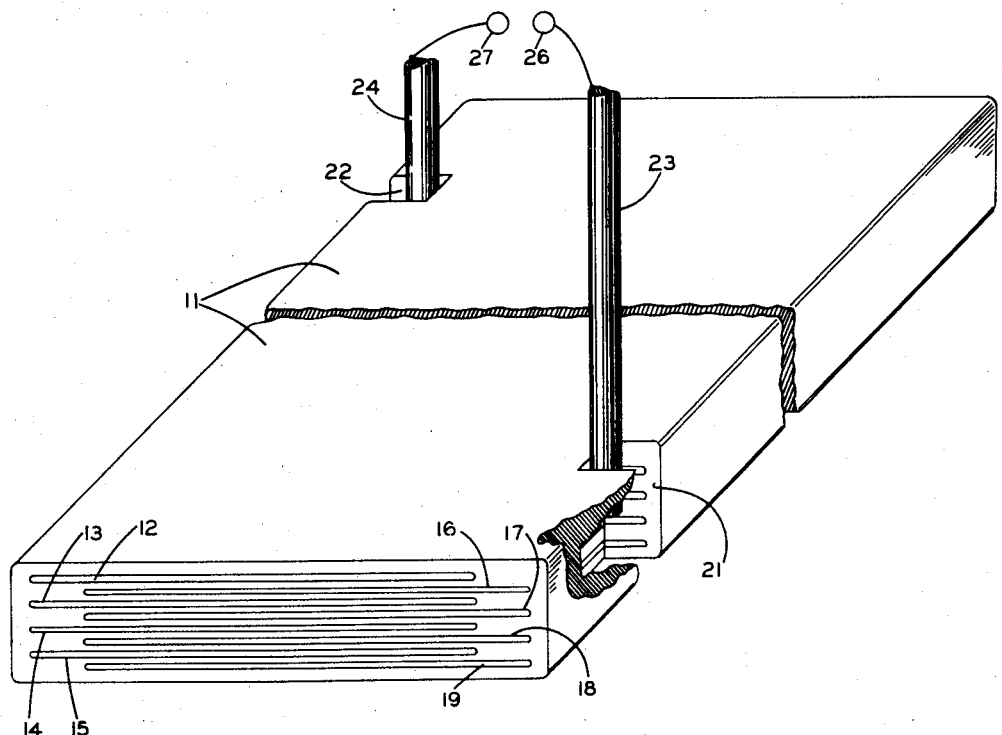

Jan. 5, 1960     C. K. GRAVLEY     2,919,483

METHOD OF FORMING CERAMIC CAPACITORS

Filed March 21, 1955     2 Sheets-Sheet 1

*INVENTOR.*
CHARLES K. GRAVLEY

ATTORNEY

United States Patent Office 2,919,483
Patented Jan. 5, 1960

2,919,483

METHOD OF FORMING CERAMIC CAPACITORS

Charles K. Gravley, Willoughby, Ohio, assignor to Clevite Corporation, Cleveland, Ohio, a corporation of Ohio Application March 21, 1955, Serial No. 495,664

4 Claims. (Cl. 25—156)

This invention relates to electrical capacitors of the type in which electrical energy is stored in, or near electroded surfaces of, a body of a solid dielectric material, and more particularly to methods of forming and producing such capacitors of ceramic material preferably having high permittivity. The term "permittivity," as used hereinbelow, is taken to mean the permittivity, or dielectric constant, of the material relative to the permittivity of space.

This application is a continuation-in-part of my copending applications for Letters Patent Serial No. 343,054 for improvements in Bending-Responsive Electromechanical Transducer Device, matured to Patent No. 2,841,722 and Serial No. 343,055 for improvements in Forming Electromechanically Sensitive Ceramic Bodies, matured to Patent No. 2,875,501 both of which were filed March 18, 1953, and assigned to the same assignee as is the present invention.

In my application for Letters Patent Serial No. 495,665, filed concurrently herewith and assigned to the same assignee, which also is a continuation-in-part of my aforesaid copending application Serial No. 343,054, there is described and claimed a capacitor of high permittivity ceramic material comprising a noncomposite body having numerous parallel holes of capillary cross-sectional dimensions, these holes being provided with conductive material forming electrode structure and with terminal lead connections to this electrode structure connecting at least one terminal lead individually to a large number of the internal electrodes. While such a capacitor may be formed with remarkable ease using the methods disclosed and claimed in my aforementioned application Serial No. 343,055 and may provide a highly useful and efficient capacitor for many purposes, there are certain advantages in many cases in providing a somewhat different structure, as set out in the present specification and in the specification and claims of my copending application Serial No. 517,596, filed as a division of and assigned to the same assignee as the present invention. The present invention relates to a method of forming such capacitors.

It has been proposed heretofore to cause unfused ceramic material to coat a plurality of metal ribbons, which thereafter are assembled in a tightly compressed ribbon bundle, wound into a coil, covered with an additional coating of ceramic material, and fired. The ribbons then may be used as the several electrodes of a capacitor. Much difficulty is likely to be experienced, however, in the choice of a suitable material for the metal ribbons, since this material must withstand ceramic-firing temperatures without physical or chemical degradation while in contact with the ceramic material. Difficulties also may be experienced in forming the coatings on the metallic surfaces of the ribbons, as well as in effecting the ceramic-firing because of the shrinkage of the ceramic material during the firing; the latter difficulties may be especially evident with high permittivity ceramic materials which tend to develop high shrinkage during firing. This process does not lend itself conveniently to the formation of a finished product without resorting to a separate coating operation after the bundle is wound into a coil. Similar proposals, open to many of the same objections, also have been made using strips of metal foil to which are applied fused or vitreous coatings.

Capacitors formed by winding alternate strips of paper and metal foil in spiral fashion have become common in the art. The flexibility of these materials makes possible various convenient arrangements for making contact individually with the several layers of metal foil. However, the paper or plastic materials forming the dielectric in capacitors of such construction usually have permittivities well under 10, while solid ceramic materials having permittivities of about 100 or higher, which may be classed as high permittivity materials, are available. Nevertheless, commercially practicable capacitor structures embodying such ceramic materials in the capacitance ranges customarily covered by the aforementioned paper capacitors have presented practical difficulties to the art and do not seem to have been available heretofore.

It is an object of the present invention therefore, to provide new and improved methods of forming capacitors of high permittivity dielectric material which avoids one or more of the above-mentioned disadvantages of the prior art devices.

It is a further object of the invention to provide new and improved methods of forming capacitors of high permittivity ceramic material capable of being carried out at reasonable cost by means of continuously operated production apparatus.

In accordance with the present invention, a method of forming a ceramic capacitor body comprises pulling through a liquid coagulating agent a plurality of unrefractory thin strips, and subsequently pulling these strips carrying portions of the coagulating agent through a quantity of a dispersion of a ceramic raw material to coagulate a coating of the raw material on all surfaces of each of the strips. The method further comprises urging the coated strips together in generally face to face relationship to form a unitary structure while still in coagulating position within the quantity of the dispersion, and heating the resulting structure to ceramic-firing temperatures, with firing of the coagulated ceramic raw material and elimination of the unrefractory strips, leaving a noncomposite ceramic body having a plurality of longitudinally extending holes with relatively small hole thickness dimensions, with much greater hole width dimensions, and spaced from each other in the direction of the hole thicknesses.

For a better understanding of the present invention, together with other and further objects thereof, reference is had to the following description, taken in connection with the accompanying drawings, and its scope will be pointed out in the appended claims.

Figure 2:
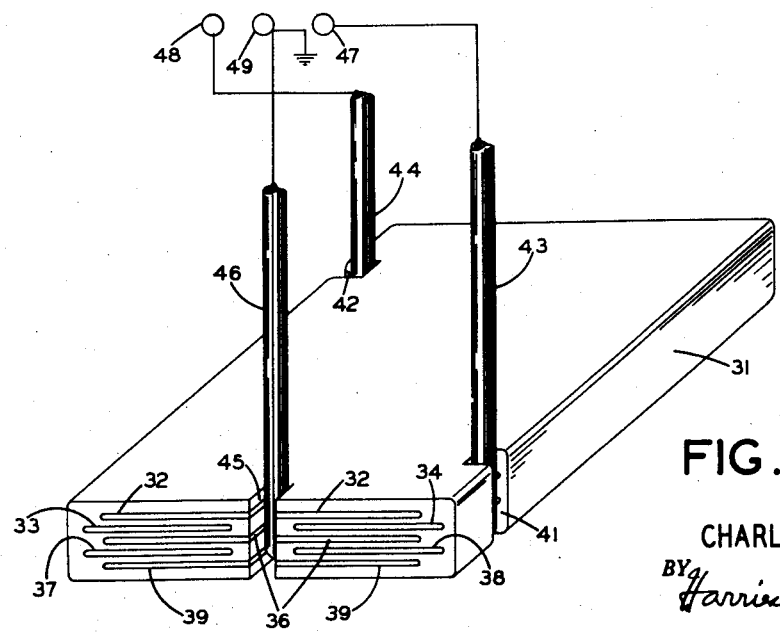
Figure 3:
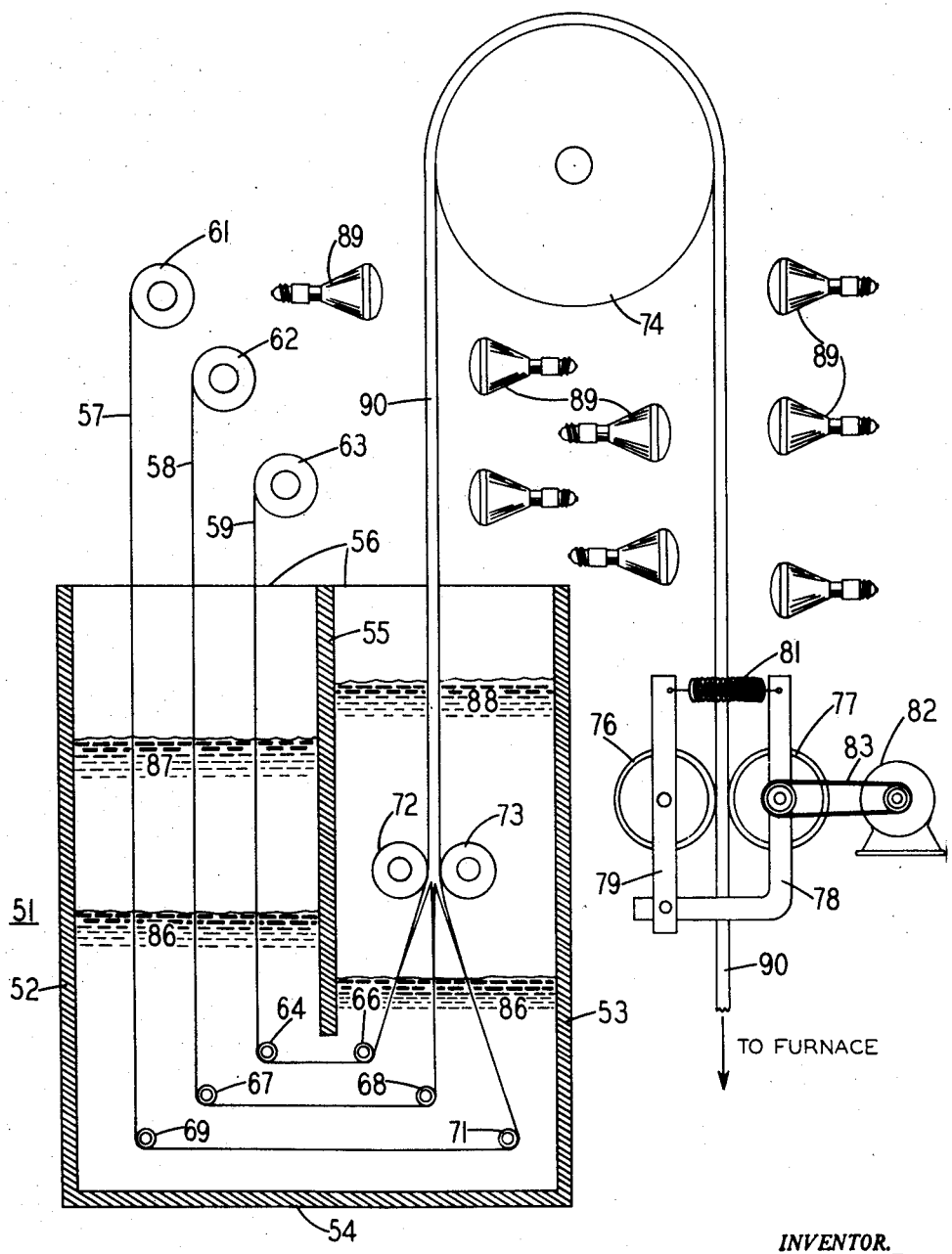

In the drawings, Fig. 1 is a perspective view of one type of ceramic capacitor which can be formed by use of the novel method contemplated by the present invention;

Fig. 2 is a perspective view of a modified form of ceramic which can be made by means of the method of the present invention; and Fig. 3 is a view in elevation of apparatus useful in carrying out the method of the present invention.

Referring now more particularly to Fig. 1 of the drawings, there is illustrated a capacitor of high permittivity ceramic material comprising a noncomposite body 11 of such material fired to ceramic maturity.

Perhaps the first ceramic material to be classified by the art as a material of exceptionally high permittivity is the rutile crystalline modification of titania, $TiO_2$, which has a permittivity value of about 110. Other ceramic material which may be classed with rutile as high permittivity materials include calcium titanate and strontium titanate having values at room temperature of about 165 and 275 respectively. Additional ceramic materials consisting primarily of a titanate salt also have been found to have remarkably high permittivities, some of them at room temperature. Notable among such materials is barium titanate, which has a room temperature permittivity somewhat higher than 1700. Barium titanate formulations containing increasing amounts of strontium titanate in solid solution exhibit peak permittivities at successively lower temperatures than the peak temperature of about 120° C. for barium titanate itself, and addition of sufficient strontium gives a peak value in excess of 10,000 at room temperature. Barium titanate containing about 4% barium stannate by weight has a permittivity of about 2,700, while addition instead to the barium titanate of 4% lead titanate provides a permittivity of about 900. Other ceramic materials which may be mentioned in this connection are potassium niobate, having a permittivity of the order of 500, and modified titanate salts in the form of lead zirconate-lead titanate solid solutions within the range of about 50 to 60 mole percent of lead zirconate, which have permittivities of about 400 to 700 depending on composition.

Thus a variety of high permittivity ceramic materials having various permittivity-temperature characteristics are known to the art. Certain compositions based on barium titanate are particularly suitable for capacitors, and additions of only a few percent of certain metallic oxides tend to suppress variations of permittivity with temperature changes. One particularly advantageous composition is comprised essentially of 10% calcium zirconate, 10% strontium titanate, and 80% barium titanate by weight, affording a permittivity of about 6,500 at room temperature and a reasonably flat permittivity-temperature characteristic. In preparing such a composition, the commercially available salts of the three components, of a grade suitable for electrical use, are ground to a fine powder and thoroughly mixed, as in a ball mill. After forming in the desired shape, the raw ceramic bodies are heated in a furnace to the ceramic-firing range and may be fired to ceramic maturity by being held for about one hour at temperatures in the range between 1300° and 1400° C.

The noncomposite body 11 shown in Fig. 1 has a plurality of holes in the ceramic material which extend parallel to each other in one direction, in this case the length direction, through the body. Each of these holes, in planes transverse to this length direction in the body, has a relatively small hole thickness dimension, preferably a capillary thickness dimension, and a much greater hole width dimension. Holes of capillary thickness usually are particularly well adapted to receive conductive electrode material in fluent form. Hole widths at least 5 or 10 times the hole thickness are contemplated, and the holes may be 50 to 100 or more times as wide as they are thick. These holes are spaced from each other in the direction of the hole thicknesses.

As seen at the end of the body 11 in Fig. 1, four holes 12, 13, 14, and 15 are provided with the left edges of these holes approaching rather closely to the left edge of the body 11. Below each of these holes is a corresponding one of another set of holes designated 16, 17, 18, and 19 respectively, and the edges of adjacent ones of these eight holes are relatively displaced in the direction of the hole widths. Thus, considering for example the adjacent holes 12 and 16, their edges are displaced to the left and to the right respectively, while, considering another pair of adjacent holes 18 and 15, their edges are displaced to the right and to the left respectively.

Conductive material is affixed to the interior surfaces of these holes 12–19, such material being inserted in the holes to provide individual internal electrodes. Conductive material may be caused to enter the holes in a manner described hereinbelow, and, especially with holes of capillary thickness dimensions, the conductive material as first applied usually fills the holes and on drying coats their walls to form internal electrodes. Accordingly, as viewed in Fig. 1 the holes are assumed to be completely filled. The difficulties of attempting to form ceramic bodies by firing raw bodies containing metallic inserts, intended to serve as electrodes, are pointed out hereinabove, and it is intended in accordance with the present invention to take advantage of a ceramic capacitor structure and a method of forming such structure which permit the insertion in the holes, after the ceramic-firing, of electrode materials having a composition incapable of remaining in contact with the ceramic material and substantially unreacted at the firing temperature of the ceramic material.

Indentations 21 and 22 are provided in the opposed right and left sides of the body 11. The indentation 21 is in the right side of the body near its forward end as viewed in Fig. 1, while the indentation 22 is in the left side of the body near its rearward end. By making the depths of these indentations sufficient to extend well into the edges of those holes which are displaced toward the side having the indentation, but not so deep as to approach very closely to the adjacent edges of the other holes, the indentation 21 exposes the electrodes in the holes 16–19 but is insulated from the electrodes in the holes 12–15, while the indentation 22 exposes the electrodes 12–15 but is insulated from the electrodes 16–19. Thus it appears that the indentations 21 and 22 expose individually the conductive material in only the ones of the holes 12–19 whose edges are displaced toward the respective opposed sides of the body 11.

Terminal lead connections are provided for the conductive material forming the individual electrodes in each of the holes, with the conductive electrode material in any two adjacent ones of the holes connected to different terminal leads. These terminal lead connections include leads 23 and 24 individually in contact with the conductive material in the indentations 21 and 22 respectively. Thus the lead 23 is soldered or otherwise conductively affixed within the indentation 21 in contact with each of the electrodes 16–19. The edge of the body 11 is cut away in the view of Fig. 1 to show the interior of the indentation 21, and the lower end of the lead 23 also has been cut away to show the conductive material or electrodes in the lower holes 18 and 19 exposed by the indentation 21. The lead 24 similarly is conductively affixed within the indentation 22 to the electrodes 12–15 exposed therewithin. For simplicity of illustration the solder or other material used to hold the leads in the indentations and to effect connections with the exposed electrodes has been omitted in the view of Fig. 1. The leads 23 and 24 terminate in a pair of terminals 26 and 27 respectively.

As an example, the following dimensions may be given for a capacitor arranged as shown in Fig. 1. Over-all dimensions may be 3/32 inch thick, 9/32 inch wide, and 1 inch long. Capillary hole thicknesses of the order of 0.002 to 0.015 inch, and usually 0.005 inch or less, are preferred. The hole thicknesses may be 0.003 inch and the hole widths may be 1/4 inch with alternate holes displaced 0.025 inch in the width direction. The holes may be spaced about 0.005 inch apart with layers half again as thick built up over the top hole, under the bottom hole, to the left of the holes 12–15, and to the right of the holes 16–19.

Fig. 2 shows in perspective view a somewhat smaller capacitor having a different arrangement of the internal electrodes and terminal lead connections. The capacitor of Fig. 2 is a three terminal capacitor arranged to have a terminal, which conveniently can be grounded, connected to a group of common electrodes which are capacitively coupled to two other groups of electrodes, each connected to respective terminals. Thus the capacitor body 31 has an upper electroded hole 32 extending longitudinally of the body, two longitudinally extensive electrodes 33 and 34 therebelow, a central electrode 36 beneath the electrodes 33 and 34, two more longitudinally extensive electrodes 37 and 38 below the electrode 36, and a lower electrode 39. Each of the upper, central, and lower electrodes 32, 36, and 39 is continuous between its left and right edges, but these edges are well spaced from the left and right edges of the body 31. The left edges of the holes 33 and 37 and the right edges of the holes 34 and 38 approach more closely to the left and right edges respectively of the body 31. The pair of holes 33 and 34 lie in a single plane, but these holes are separated by a solid bridge of the ceramic material running the length of the body. The holes 37 and 38 are disposed similarly in another plane.

For making terminal lead connections to these electrodes, indentations 41 and 42, similar to the indentations 21 and 22 in the Fig. 1 arrangement, are provided in the sides of the body 31. Lead wires 43 and 44 are affixed conductively in the indentations 41 and 42 respectively, so that the lead 43 is in contact with electrodes 34 and 38 only while the lead 44 is in contact with electrodes 33 and 37 only. Another indentation 45 is provided in the body 31, this one centrally located at one end of the body so as to be insulated from the electrodes 33, 34, 37, and 38 by the aforementioned bridges of dielectric material. A lead wire 46 is conductively affixed to the ground electrodes 32, 36, and 39 within the indentation 45. The terminal lead connections 43, 44, and 46 may be provided with respective terminals 47, 48, and 49.

It will be seen that in the capacitor of Fig. 2 the edges of adjacent ones of the holes are relatively displaced in the direction of their widths. For example, the electroded holes 33 and 34 are displaced leftward and rightward respectively with relation to the adjacent electrode 32 or to the adjacent electrode 36. The indentations 41 and 42 in the opposed sides of the body serve to expose individually the conductive material in only those holes whose edges are displaced toward these indentations. Thus the electrodes in each adjacent pair of holes are connected individually to different terminal leads to form, in conjunction with the dielectric ceramic between the holes of the pair, a capacitor element effectively connected in parallel with other capacitor elements in the capacitor body.

It will be understood that a great variety of arrangements of electrodes may be provided of the types illustrated by way of examples in Figs. 1 and 2, and that identical arrangements but with fewer or more electrodes are feasible.

Fig. 3 shows in elevation a section through one form of apparatus suitable for carrying out the method of forming a ceramic capacitor in accordance with the invention. The apparatus includes a tank 51 having sides 52 and 53, a bottom 54, and a central dividing plate 55 which does not extend to the bottom 54 of the tank 51. The plate 55 does extend, of course, between the front wall of the tank, not shown in the sectional view, and its rear wall 56.

A plurality of unrefractory thin strips 57, 58, and 59 is provided on respective spools 61, 62, and 63. These spools conveniently are retained on horizontally disposed spindles above the left hand portion of the tank 51 with the spools 61 and 63 to the left and to the right respectively of the spool 62. Guide bars 64, 66 are provided for the strip 59 in the portions of the tank below the plate 55, and similarly disposed pairs of guide bars 67, 68, and 69, 71 are disposed lower in the tank for the strips 58 and 57 respectively.

A pair of rolls 72 and 73 is located higher in the tank to the right of the plate 55 with their axes horizontal and parallel to each other, and an arrangement, not shown, is provided to adjust the spacing between these axes and preferably to maintain a light spring bias urging the rolls 72 and 73 toward each other somewhat when there is a predetermined spacing between the rolls. A guide roll 74 of large diameter is placed above the tank so that a vertical plane tangent to the left of the roll 74 passes near the space between the rolls 72 and 73. A pair of driving rolls 76, 77 having resilient surface layers is situated with the opposed faces of the driving rolls beneath the right side of the guide roll 74. The roll 77 is journaled in a bearing carried by a member 78, to which is hinged another member 79 having a bearing in which the roll 76 is journaled. A spring 81 between the remote ends of the members 78 and 79 permits the attainment of adjustable pressure between the rolls 76 and 77. A motor 82 is arranged to drive the roll 77 through a belt 83.

In operating the apparatus of Fig. 3 to form a ceramic capacitor body in accordance with the method of the invention, the three strips 57, 58, and 59 are threaded through the tank 51 under their respective guide bars, between the rolls 72 and 73 in face to face position with the strip 58 in the middle, over the guide roll 74, and between the driving rolls 76 and 77. The strips conveniently may be, for example, of a parchment paper about 0.003 inch thick and ¼ inch wide. A quantity of mercury 86 is placed in the tank 51 so that its level will remain above the bottom of the central plate 55 regardless of the weight of the liquids or liquid suspensions which are floated on the mercury on each side of the tank.

To the left of the plate 55 a liquid coagulating agent 87 is floated on the mercury. A preferred coagulating agent is an aqueous solution of ammonium pentaborate, $NH_4B_5O_8$, which may be made using 10% to 15% of the pentaborate by weight and advantageously also may contain about 0.1% by weight of a nonionic wetting agent such as ether sulfonate. An aqueous dispersion 88 of the ceramic raw material is floated on the mercury to the right of the plate 55. As an example of a suitable dispersion, a slurry or slip may be used containing 1,000 grams of a comminuted, electrical grade barium titanate ceramic raw material containing the strontium titanate and calcium zirconate additions mentioned hereinabove with perhaps 1%–2% by weight of other oxidic elements, some of which act as fluxes during the subsequent ceramic-firing. This ceramic raw material is dispersed in somewhat more than 200 grams of water. A dispersing agent such as a quantity of about 10 grams of a sodium lignosulfonate is dissolved in this slip, to which also are added 75 cubic centimeters of a 20% aqueous solution of polyvinyl alcohol. The latter is added so as to be coagulated or gelled from the dispersion along with the dispersed material as a binder to add green strength to the ceramic material to be coagulated.

When the motor 82 is started, it causes the pressure rolls 76 and 77, held together by the spring 81, to pull the plurality of unrefractory thin strips 57, 58 and 59 through the liquid coagulating agent 87. The three strips, bearing some of the coagulating agent, then travel downward through the mercury, under the guide bars, and thence upward into the dispersion 88. As the strips carrying portions of the coagulating agent subsequently are pulled toward the rolls 72 and 73 through the quantity 88 of the dispersion of ceramic raw material, a coating of the raw material is coagulated and accumulates in increasing thicknesses on all surfaces of each of the strips. General procedures of this type for coagulating a layer of ceramic raw material on an unrefractory form from a dispersion of the material in finely comminuted state, after first applying a coagulating agent to the form, which thereafter is eliminated during firing, are disclosed and claimed in my Patent No. 2,554,327.

The speed of the motor 82 pulling the strips through the apparatus and the distance traveled by the strips through the dispersion 88 to the rolls 72 and 73 are adjusted to accumulate layers of desired thickness on the strips. The thickness of these layers is roughly half the separation desired between the holes in the ceramic body to be produced, which is a body of the type shown in Fig. 1 having wide, thin holes arranged one above the other. The separation of the rolls 72 and 73 is adjusted so that the rolls urge the coated strips 57, 58, and 59 together in generally face to face relationship with moderate pressure to form a unitary structure while the strips are still in coagulating position within the quantity 88 of the dispersion. In fact, it often is desirable to coagulate a thicker layer of raw ceramic material on the outer surfaces of this unitary structure than was coagulated on the individual strips prior to their passage between the rolls 72 and 73, and such later coagulation tends to proceed more slowly because smaller quantities of the coagulant migrate through the layers already deposited on the strips. For these reasons the unitary structure may pass aolng a path perhaps twice as long through the dispersion after emerging from the rolls 72 and 73 then before passing between them.

The curvature of the periphery of the guide roll 74 is large enough to prevent damage to the green ceramic body, and in practice the roll 74 even may be larger in diameter than the width of the tank 51. After the coagulated material on the strips reaches the driving rolls 76, 77 the latter are forced apart by the increased thickness of the elongated body passing between them, and thereafter it is easy to maintain uniformity of the cross-sectional dimensions of the elongated body emerging from the apparatus. A number of heat lamps 89 is provided, directed at the elongated unitary body 90 between the tank 51 and the guide roll 74 and between the roll 74 and the driving rolls 76, 77, to remove much of the moisture from the newly formed green ceramic body.

The resulting structure then is heated to ceramic-firing temperatures, with firing of the coagulated ceramic raw material and elimination of the unrefractory strips, leaving a noncomposite elongated ceramic body having a plurality of longitudinally extending holes with relatively small, preferably capillary, hole thickness dimensions, with much greater hole width dimensions, and spaced from each other in the direction of the hole thickness. A body of the type shown in Fig. 1 but with three holes instead of eight would be produced by the apparatus illustrated in Fig. 3. To obtain the desired relative lateral displacement of the edges of the holes in the body it is only necessary to provide on the guide bars 66, 68, and 71 centering pins or discs, not shown, extending radially from the bars and retaining the strip 58 in a position displaced sideways relatively to the strips 57 and 59.

The elongated body 90 emerging from the apparatus shown in Fig. 3 may be wound helically on storage drums and later fired or may be passed directly into a continuous furnace for the firing. If a continuous firing operation is not convenient, the long body 90 may be cut into lengths first, but it is preferred to fire the elongated body before it is divided into predetermined lengths. The furnace and other apparatus for subsequent treatment of the ceramic body may be of conventional construction and are not illustrated in the drawings.

To form internal electrodes, conductive material in a fluent form is introduced into the holes in the lengths which have been cut from the elongated ceramic body. To accomplish this, one end of each length may be dipped into a suspension of finely divided conductive material, such as silver or carbon, in a suitable liquid. When the holes are of capillary thickness this fluent material tends to rise by capillary action into the holes, and it is helpful in any case to evacuate the region around the other ends of the holes to help force the fluent material under air pressure into the holes. The conductive material in the lengths of ceramic body then is dried to form internal electrodes affixed within the holes. This may be done in an oven. A conductive material containing a ceramic flux, of the type known in the art as a conductive paint, may be used, in which case the heating operation forms a vitreous conductive electrode within each of the holes.

In forming indentations, such as are shown in the sides or an end of the bodies illustrated in Figs. 1 and 2, for the purpose of effecting contact with only one set of internal electrodes, short cuts may be made with a continuous band saw. The terminal lead wires then are laid in these indentations and affixed by means of a conductive cement or solder to the internal electrodes exposed by the saw cut.

While there have been described what at present are considered to be the preferred embodiments of the invention, it will be obvious to those skilled in the art that various changes and modifications can be made therein without departing from the invention, and it is aimed, therefore, in the appended claims to cover all such changes and modifications as fall within the true spirit and scope of the invention.

What is claimed is:

1. The method of forming a ceramic capacitor body comprising: pulling through a liquid coagulating agent a plurality of unrefractory flexible thin strips; subsequently simultaneously pulling said strips, carrying portions of said coagulating agent, longitudinally through a quantity of dispersion of ceramic raw material to coagulate a coating of said raw material on all surfaces of each of said strips; urging said coated strips together in generally face to face relationship to form a unitary structure while still in coagulating position within said quantity of said dispersion; and heating the resulting structure to ceramic-firing temperatures, with firing of said coagulated ceramic raw material and elimination of said unrefractory strips, leaving a noncomposite ceramic body having a plurality of longitudinally extending holes with relatively small hole thickness dimensions, with much greater hole width dimensions, and spaced from each other in the direction of said hole thicknesses.

2. The method of forming a ceramic capacitor body, comprising: pulling through a liquid coagulating agent a plurality of unrefractory flexible thin strips; subsequently simultaneously pulling said strips, carrying portions of said coagulating agent, longitudinally through a quantity of a dispersion of ceramic raw material to coagulate a coating of said raw material on all surfaces of each of said strips; urging said coated strips together in generally face to face relationship to form a unitary structure while still in coagulating position within said quantity of said dispersion; and heating the resulting structure to ceramic-firing temperatures, with firing of said coagulated ceramic raw material and elimination of said unrefractory strips, leaving a noncomposite ceramic body having a plurality of longitudinally extending holes with capillary hole thickness dimensions, with much greater hole width dimensions, and spaced from each other in the direction of said hole thicknesses.

3. The method of forming a ceramic capacitor, comprising: pulling through a liquid coagulating agent a plurality of unrefractory flexible thin strips; subsequently simultaneously pulling said strips, carrying portions of said coagulating agent, longitudinally through a quantity of a dispersion of ceramic raw material to coagulate a coating of said raw material on all surfaces of each of said strips; urging said coated strips together in generally face to face relationship to form a unitary structure while still in coagulating position within said quantity of said dispersion; heating the resulting structure to ceramic-firing temperatures, with firing of said coagulated ceramic raw material and elimination of said unrefractory strips, leaving a noncomposite elongated ceramic body having a plurality of longitudinally extending holes with relatively small hole thickness dimensions, with much greater hole width dimensions, and spaced from each other in the direction of said hole thicknesses; dividing said elongated body into predetermined lengths; and introducing conductive material into said holes in said lengths to form internal electrodes affixed within said holes.

4. The method of forming a ceramic capacitor, comprising: pulling through a liquid coagulating agent a plurality of unrefractory flexible thin strips; subsequently simultaneously pulling said strips, carrying portions of said coagulating agent, longitudinally through a quantity of a dispersion of ceramic raw material to coagulate a coating of said raw material on all surfaces of each of said strips; urging said coated strips together in generally face to face relationship to form a unitary structure while still in coagulating position within said quantity of said dispersion; heating the resulting structure to ceramic-firing temperatures, with firing of said coagulated ceramic raw material and elimination of said unrefractory strips, leaving a noncomposite elongated ceramic body having a plurality of longitudinally extending holes with capillary hole thickness dimensions, with much greater hole width dimension, and spaced from each other in the direction of said hole thicknesses; dividing said elongated body into predetermined lengths; introducing conductive material in fluent form into said holes in said lengths; and drying said conductive material in said lengths to form internal electrodes affixed within said holes.

References Cited in the file of this patent

UNITED STATES PATENTS

| | | |
|---|---|---|
| 2,171,006 | Morgan et al. | Aug. 29, 1939 |
| 2,238,031 | Brennan | Apr. 15, 1941 |
| 2,266,263 | Raiche | Dec. 16, 1941 |
| 2,389,420 | Deyrup | Nov. 20, 1945 |
| 2,399,313 | Ballard | Apr. 30, 1946 |
| 2,405,529 | Smith | Aug. 6, 1946 |
| 2,506,244 | Stopka | May 2, 1950 |
| 2,554,327 | Gravley | May 22, 1951 |
| 2,682,292 | Nagin | June 29, 1954 |